United States Patent
Watkins

(10) Patent No.: US 10,644,394 B2
(45) Date of Patent: May 5, 2020

(54) TECHNIQUE FOR FULL DUPLEX WITH SINGLE ANTENNA

(71) Applicant: Kabushiki Kaisha Toshiba, Minato-ku (JP)

(72) Inventor: Gavin Watkins, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 223 days.

(21) Appl. No.: 15/434,505

(22) Filed: Feb. 16, 2017

(65) Prior Publication Data

US 2017/0358857 A1    Dec. 14, 2017

(30) Foreign Application Priority Data

Jun. 13, 2016    (GB) .................................. 1610280.8

(51) Int. Cl.
*H01Q 1/52* (2006.01)
*H01Q 3/26* (2006.01)
(Continued)

(52) U.S. Cl.
CPC .............. *H01Q 1/525* (2013.01); *H01Q 3/26* (2013.01); *H01Q 21/00* (2013.01); *H04B 1/56* (2013.01); *H04L 5/14* (2013.01)

(58) Field of Classification Search
CPC .......... H01Q 1/525; H01Q 3/26; H01Q 21/00; H04B 1/56; H04L 5/14
See application file for complete search history.

(56) References Cited

U.S. PATENT DOCUMENTS 5,691,978 A    11/1997    Kenworthy
6,567,394 B1 *    5/2003    Arisawa ............... G06K 7/0008
                                                          332/170
(Continued)

FOREIGN PATENT DOCUMENTS

EP    1 990 925 A2    11/2008
EP    2 639 964 A2    9/2013
(Continued)

OTHER PUBLICATIONS

United Kingdom Search Report dated Dec. 20, 2016 in GB Application 1610280.8, filed on Jun. 13, 2016 ( with written opinion).
(Continued)

*Primary Examiner* — Graham P Smith
*Assistant Examiner* — Jae K Kim
(74) *Attorney, Agent, or Firm* — Oblon, McClelland, Maier & Neustadt, L.L.P.

(57) ABSTRACT

A system and method for duplexing radio frequency signals for full-duplex transmission and reception by an antenna. The system comprises a signal coupler comprising an antenna node configured to be connected to the antenna, an input node for receiving radio frequency signals for transmission by the antenna, an output node for outputting radio frequency signals received by the antenna, and a coupling node. The system further comprises a variable impedance element connected to the coupling node to reduce interference between the signals for transmission by the antenna and the signals received by the antenna, the variable impedance element comprising a variable phase shifter connected to a variable attenuator.

15 Claims, 16 Drawing Sheets

(51) Int. Cl.
*H01Q 21/00* (2006.01)
*H04B 1/56* (2006.01)
*H04L 5/14* (2006.01)

(56) References Cited

U.S. PATENT DOCUMENTS

| | | | |
|---|---|---|---|
| 10,061,950 B1 * | 8/2018 | Pesavento | G06K 7/10366 |
| 2007/0247257 A1 | 10/2007 | Shastry et al. | |
| 2015/0222412 A1 * | 8/2015 | Laughlin | H04W 72/0453 |
| | | | 370/252 |
| 2015/0341125 A1 | 11/2015 | Bharadia et al. | |
| 2016/0094331 A1 | 3/2016 | White et al. | |
| 2016/0112226 A1 * | 4/2016 | Martinez | H04L 27/2003 |
| | | | 455/110 |
| 2017/0093441 A1 * | 3/2017 | Mandegaran | H04B 1/005 |
| 2017/0243032 A1 * | 8/2017 | Pesavento | G06K 7/10297 |

FOREIGN PATENT DOCUMENTS

| | | | | |
|---|---|---|---|---|
| EP | 2639964 A2 * | 9/2013 | | H04B 1/52 |
| EP | 2 903 170 A1 | 8/2015 | | |
| GB | 2 372 902 A | 9/2002 | | |
| JP | 2015-149721 A | 8/2015 | | |
| WO | WO 2007/149957 A1 | 12/2007 | | |
| WO | WO 2014/065825 A1 | 5/2014 | | |
| WO | WO 2014/151055 A1 | 9/2014 | | |
| WO | WO 2016/023445 A1 | 2/2016 | | |

OTHER PUBLICATIONS

Knox, M.E., "Single Antenna Full Duplex Communications using a Common Carrier"; WAMICON 2012 IEEE Wireless & Microwave Technology Conference, 2012, 6 pages.

Bharadia, D., et al., "Full Duplex Radios", ACM SigComm Conference, 2013, pp. 375-386.

Cryan, M.J., et al, "Integrated Active Antenna with Simultaneous Transmit-Receive Operation", IEEE Antennas and Propagation Society International Symposium, 1996 Digest; 1996, pp. 1314-1317.

Cryan, M.J., et al., "An Integrated Active Circulator Antenna", IEEE Microwave and Guided Wave Letters, Jul. 1997, vol. 7, No. 7, pp. 190-191.

Bai, P. et al., "A Novel RX-TX Front-Ends for Passive RFID Reader with High Isolation", 2007 International Symposium on Microwave, Antenna, Propagation and EMC Technologies for Wireless Communications, 2007, pp. 332-335.

Laughlin, L., et al., "A Widely Tunable Full Duplex Transceiver Combining Electrical Balance Isolation and Active Analog Cancellation" , 2015 IEEE 81st Vehicular Technology Conference (VTC Spring), 2015, 5 pages with cover page.

Koll, V.G., et al., "Simultaneous Two-Way Data Transmission over a Two-Wire Circuit" , IEEE Transactions on Communications, 1973, vol. 21, No. 2, pp. 143-147.

* cited by examiner

TECHNIQUE FOR FULL DUPLEX WITH SINGLE ANTENNA

TECHNICAL FIELD

The present disclosure relates to a system and method for duplexing signals for transmission by an antenna and signals received by the antenna. In particular, but without limitation, this disclosure relates to a method and system for providing full duplex communication via a single antenna.

BACKGROUND

The 802.11ax WiFi standard aims to increase data-rates by up to 1000 times. One means of doing this is with full-duplex (FD) operation, whereby a system can simultaneously transmit and receive signals on the same frequency.

Due to hardware limitations a transmitted signal will tend to leak into the receive path. At best it will degrade the signal-to-noise ratio of the receiver, and at worst the strong transmit signal will permanently damage the receiver. Spatial separation of transmit and receive antennas can isolate the paths, but only where space is available, e.g. at opposite ends of a laptop screen. For many applications where space is at a premium, like mobile phone handsets, a single antenna is more practical.

Circulators can be used to couple receive and transmit paths to a single antenna. Although circulators provide fair isolation, they are large items that do not lend themselves well to miniaturisation. At best, they only have 10% fractional bandwidth with high isolation and low loss. For example, an isolator covering 2.3-2.5 GHz can only provide 20 dB isolation over that band.

There is therefore a need for an improved means of isolating transmit and receive paths in a communication system to provide effective full-duplex operation for use in smaller systems, such as mobile phones.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
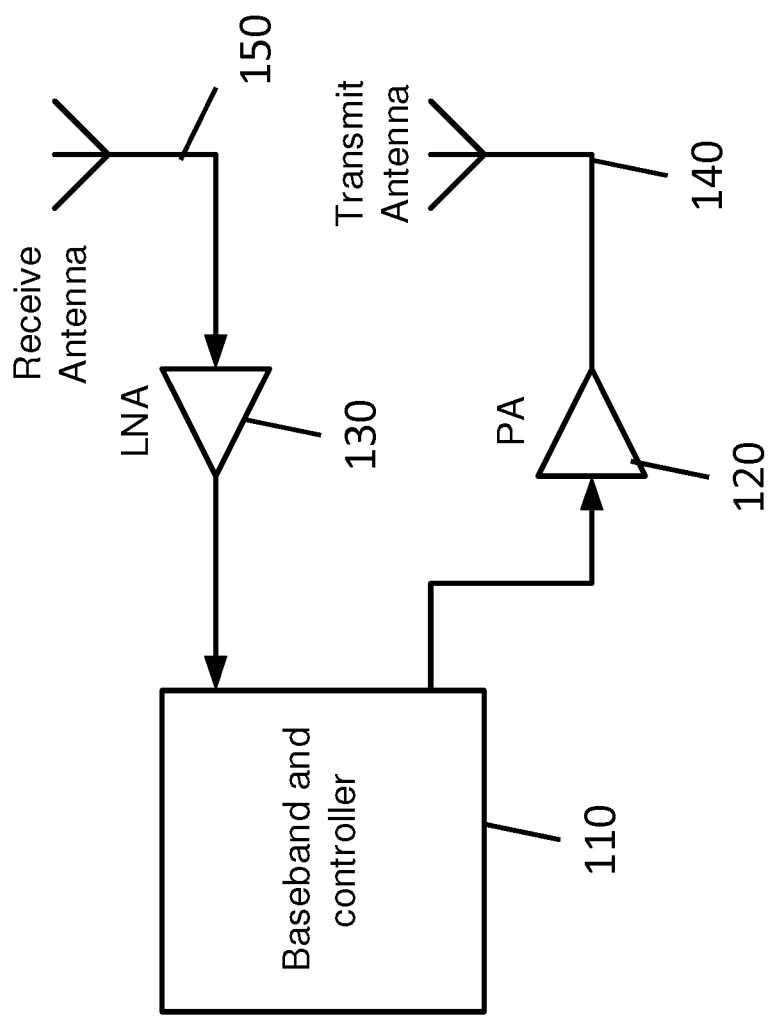
FIG. 1 shows a system for full-duplex communication comprising separate receive and transmit antennas.

According to a first arrangement there is provided a system for duplexing radio frequency signals for full-duplex transmission and reception by an antenna. The system comprises a signal coupler comprising an antenna node configured to be connected to the antenna, an input node for receiving radio frequency signals for transmission by the antenna, an output node for outputting radio frequency signals received by the antenna, and a coupling node. The system further comprises a variable impedance element connected to the coupling node to reduce interference between the signals for transmission by the antenna and the signals received by the antenna, the variable impedance element comprising a variable phase shifter connected to a variable attenuator.

By providing a variable impedance element comprising a variable phase shifter connected to a variable attenuator, the present arrangement allows for the independent tuning of the magnitude and phase of the reflection coefficient at the coupling node to accurately and efficiently isolate the signals being received from the signals being transmitted. This is because adjusting the attenuation of the variable impedance element adjusts the magnitude of reflection coefficient at the coupling node whilst adjusting the phase shift adjusts the phase angle of the reflection coefficient at the coupling node. This variable impedance element also provides tuning over a wide range of frequencies and may be easily manufactured using a number of switching elements to allow simpler digital control.

The signal coupler may be configured to couple the input node (transmit path) and output node (receive path) to the antenna but to isolate the input and output nodes from each other to reduce interference between signals for transmission and the signals received by the antenna. The signal coupler may be configured to provide signals received at the input node to the antenna node for transmission by the antenna and to provide signals received by the antenna to the output node via the antenna node. The coupling node may be coupled to the input node so that the reflection coefficient at the coupling node can be adjusted so that reflections at the coupling node cancel out the signals for transmission by the antenna.

The nodes of the signal coupler may be ports. In one arrangement the variable phase shifter and variable attenuator are connected in series. The variable phase shifter and variable attenuator may be connected in either order and may be connected to ground. The system may comprise the antenna for simultaneous transmission and receipt of radio signals. The system may operate in full-duplex mode with signals being transmitted and received on the same frequency. The signal coupler may be a directional coupler, a hybrid coupler, a rat race coupler, or any other form of coupler or combiner that can couple signals or power applied at one port to another.

In one arrangement the variable phase shifter comprises a set of switchable variable phase shifting elements configured to be switched to increase or decrease the phase shift across the variable phase shifter and/or the variable attenuator comprises a set of switchable variable attenuating elements configured to be switched to increase or decrease the attenuation across the variable attenuator. This allows easy digital control. The variable phase shifter may be manufactured in an integrated circuit using common components. Each variable phase shifting/variable attenuating element may comprise a bypass line, a phase shifting line/attenuating line and a pair of two-way switches connected on either end of the two lines. When the switches are in a first position, connected to the phase shifting line/attenuating line, the variable phase shifting/attenuating element has a higher phase shift/attenuation than when the switches are in a second position, connected to the bypass line. Each variable attenuating element may comprise a pi-pad or a T-pad.

The variable phase shifter may be a variable delay line, thereby providing a phase shift by delaying signals across the variable delay line, or may be any other form of phase shifter that is able to provide a variable phase shift to the signal. Accordingly, the phase shifting elements may be delay elements and the phase shifting lines may be delay lines.

According to one arrangement the system is configured to adjust the impedance of the variable impedance element to reduce interference between the signals for transmission by the antenna and the signals received by the antenna. The system may comprise a controller configured to control the variable impedance element to tune the impedance to reduce interference between the signals for transmission and the signals received by the antenna. The system may be configured to independently tune the phase shift and the attenuation of the variable impedance element.

According to an arrangement the system comprises one or more further variable impedance elements and the variable impedance element and the one or more further variable impedance elements are connected to the coupling terminal via a power splitter. This allows multiple reflections of transmitted signals to be cancelled out.

According to an arrangement there is provided a multiple-input and multiple-output system for duplexing radio frequency signals, the system comprising a plurality of systems as described above wherein the systems are connected to each other via a common node connected to the coupling node of each system. This allows multiple-input and multiple-output (MIMO) operation. The number of inputs and outputs corresponds to the number of duplexing systems connected to the common node. The common node may be connected to the coupling node of each duplexing system via a respective power splitter. This allows each duplexing system to include a number of variable impedance elements to cancel out multiple reflected signals.

In one arrangement one or more of the systems have a variable impedance element located between the coupling node for the respective system and the common node. In one arrangement each of the systems has a variable impedance element located between the coupling node for the respective system and the common node. This improves isolation between the systems.

According to a further arrangement there is provided a device for wireless communication comprising a system as described above and further comprising an antenna connected to the antenna node of the signal coupler for full duplex wireless communication and a controller. The controller is configured to provide the signals for transmission by the antenna to the input node of the signal coupler, receive from the output node of the signal coupler the signals received by the antenna, and control the variable impedance element to reduce interference between the signals for transmission by the antenna and the signals received by the antenna. Adjusting the attenuation adjusts the magnitude of reflection coefficient and adjusting the phase shift adjusts the phase angle of the reflection coefficient. This provides improved isolation between the transmitted and received signals.

According to a further arrangement there is provided a method for duplexing radio frequency signals for full-duplex transmission and reception by an antenna. The method is performed by a system comprising a signal coupler comprising an antenna node configured to be connected to the antenna, an input node, an output node and a coupling node, and a variable impedance element connected to the coupling node, the variable impedance element comprising a variable phase shifter and a variable attenuator. The method comprises receiving at the input node radio frequency signals for transmission by the antenna and outputting the signals for transmission at the antenna node, receiving at the antenna node radio frequency signals received by the antenna and outputting the signals received by the antenna at the output node, and applying a variable impedance to the coupling node via the variable impedance element to reduce interference between the signals for transmission by the antenna and the signals received by the antenna. Signals output at the antenna and output nodes may be attenuated relative to signals received at the input and antenna nodes.

According to a further arrangement the variable phase shifter comprises a set of switchable variable phase shifting elements configured to be switched to increase or decrease the phase shift across the variable phase shifter and/or the variable attenuator comprises a set of switchable variable attenuating elements configured to be switched to increase or decrease the attenuation across the variable attenuator.

According to a further arrangement the method further comprises adjusting the impedance of the variable impedance element to reduce interference between the signals for transmission by the antenna and the signals received by the antenna.

According to a further arrangement the system comprises one or more further variable impedance elements, the variable impedance element and the one or more further variable impedance elements are connected to the coupling terminal via a power splitter, and the method further comprises applying one or more further variable impedances to the coupling node via the one or more further variable impedance elements.

According to an arrangement there is provided a multiple-input and multiple-output method for duplexing signals, the method comprising connecting a plurality of systems as described above to each other via a common node connected to the coupling node of each system.

According to a further arrangement one or more of the systems are connected to the coupling node via a variable impedance element located between the coupling node for the respective system and the common node.

According to a further arrangement each of the systems are connected to the coupling node via a respective variable impedance element located between the coupling node for the respective system and the common node.

Further arrangements are shown in FIGS. 8-16.

Full-duplex operation can be difficult to implement. When simultaneous transmit and receive is required, systems tend to either utilise two separate frequency channels (i.e. frequency division duplex) or different time slots (i.e. time division duplex).

Full-duplex operation on the same frequency at the same time can be achieved with two antennas located far apart from each other, as shown in FIG. 1.

FIG. 1 shows a system for full-duplex communication comprising separate transmit 140 and receive 150 antennas. A baseband processor and controller 110 manages the signals to be transmitted by the transmit antenna 140 and the signals received at the receive antenna 150. This includes any required modulation, demodulation, mixing or digital filtering of the signals.

The controller 110 is connected to transmit and receive paths. The transmit path includes a power amplifier (PA) 120 connected to a transmit antenna 140. The receive path includes a low noise amplifier (LNA) 130 connected to a receive antenna 150.

The controller 110 is configured to send a signal to be transmitted (transmit signal) to the power amplifier 120 which amplifies the signal and provides the amplified signal to the transmit antenna 140 for transmission.

The low noise amplifier 130 is configured to amplify any signals (receive signals) received by the receive antenna and provide the amplified signals to the baseband processor and controller 110.

The system of FIG. 1 is only able to effectively function in full-duplex mode where space permits the separation of the receive 150 and transmit 140 antennas. If space is not available and a single antenna must be used, a circulator can connect both receive and transmit paths to a single antenna as shown in FIG. 2.

Figure 2:
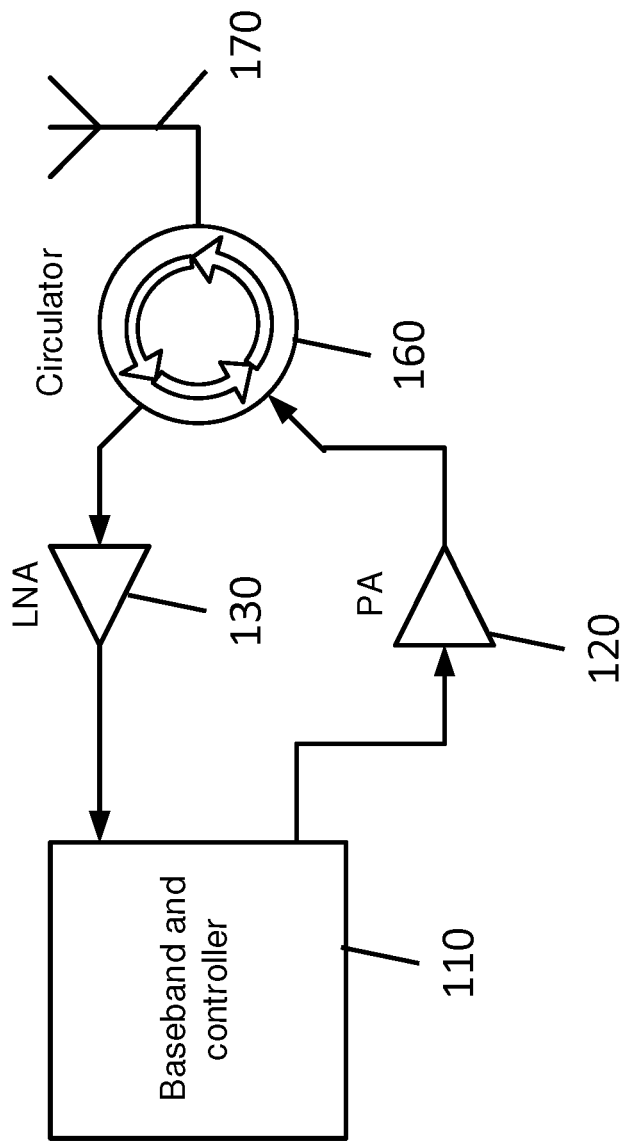
FIG. 2 shows a system for full-duplex communication comprising a single antenna.

FIG. 2 shows a system for full-duplex communication comprising a single antenna 170. The system is the same as that of FIG. 1 with the exception that the low noise amplifier 130 and the power amplifier 120 are connected to respective ports of a circulator 160. A third port of the circulator 160 is connected to a single antenna 170 for both the transmission and reception of radiofrequency (RF) signals.

The circulator 160 consists of a ring of transmission line subjected to a magnetic field so that RF waves only travel in one direction. This allows the transmit path to be isolated from the receive path, whilst also allowing any signals received at the antenna 170 to be passed to the receive path and any signals to be transmitted to be passed from the transmit path to the antenna 170. Having said this, circulators are expensive, bulky and narrowband and are therefore unsuitable for modern communications devices, particularly those that have strict space requirements.

A Wilkinson power splitter/combiner can offer broadband operation, but isolation is limited and it cannot be tuned. Other solutions include a "rat-race" combiner splitter (also known as a hybrid ring coupler) or a directional coupler (the latter shown in FIG. 3), both of which can be tuned with a variable impedance connected to their fourth port.

Figure 3:
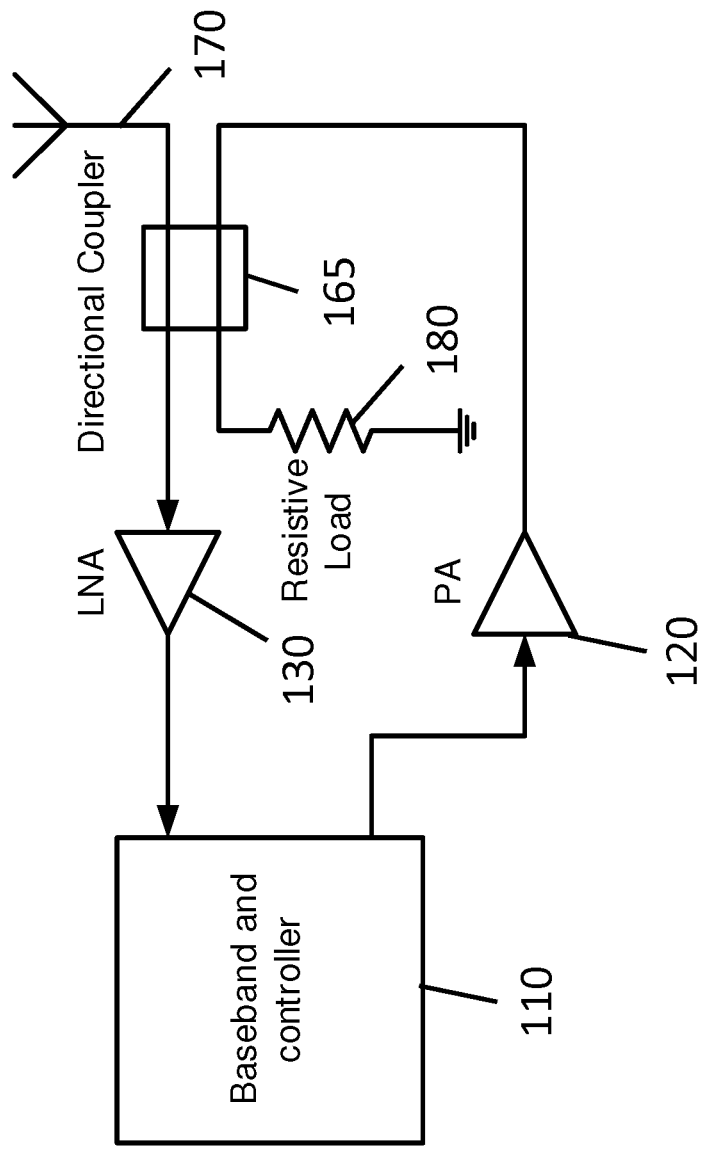
FIG. 3 shows a single antenna system for full-duplex operation comprising a directional coupler.

FIG. 3 shows a single antenna system for full-duplex communication comprising a directional coupler 165. The system is much like that of FIG. 2; however, the circulator 160 is replaced by a directional coupler 165 with a fourth port connected to ground via a resistive load 180.

Many types of directional coupler exist. The directional coupler 165 may comprise a pair of transmission lines arranged in proximity to each other to allow the lines to be coupled to each other. In FIG. 3, a first transmission line of the coupler 165 is connected between the antenna 170 and the low noise amplifier 130 of the receive path. A second transmission line of the coupler is connected between the resistive load 180 and the power amplifier 120 of the transmit path. Like the circulator 160, the directional coupler 165 isolates the receive path from the transmit path whilst coupling the transmit path and the receive path to the antenna 170. As shown later, the resistive load 180 can be replaced with a variable impedance which can be set so that the directional coupler 165 provides the appropriate isolation. The directional coupler 165 may be a hybrid (3 dB quadrature) coupler, as shown in FIG. 4.

Figure 4:
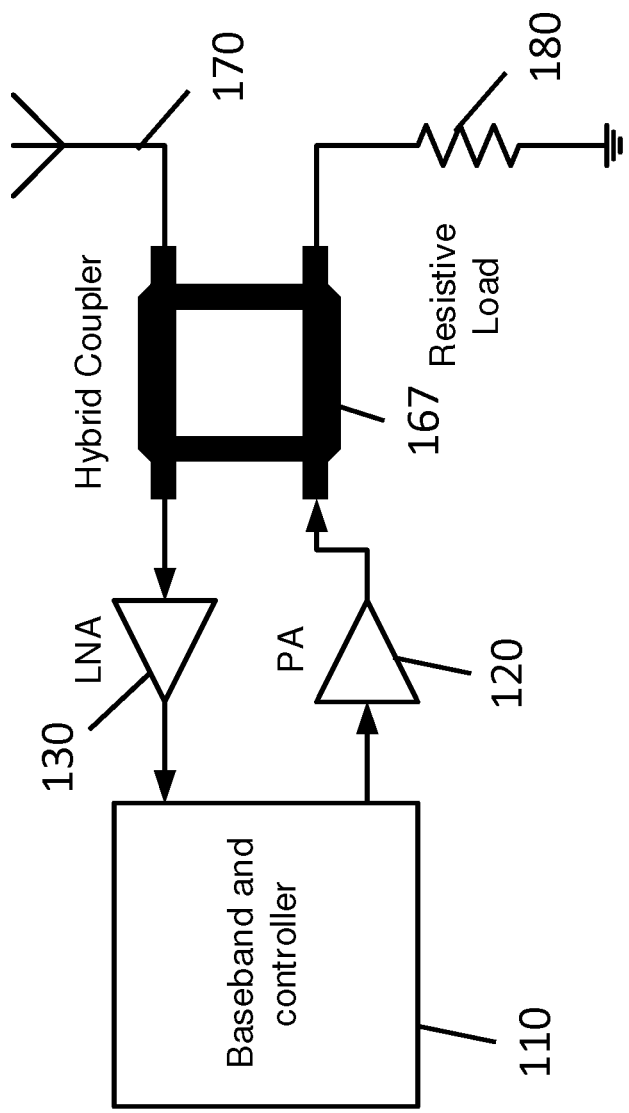
FIG. 4 shows a single antenna system for full-duplex communication comprising a hybrid coupler.

FIG. 4 shows a single antenna system for full-duplex communication comprising a hybrid coupler 167. The system is the same as that of FIG. 3; however, the directional coupler 165 is a hybrid coupler 167. In a hybrid coupler 167 the two outputs of the directional coupler (output at the ports connected to the receive path and the resistive load 180) each receive half of the input power.

Figure 5:
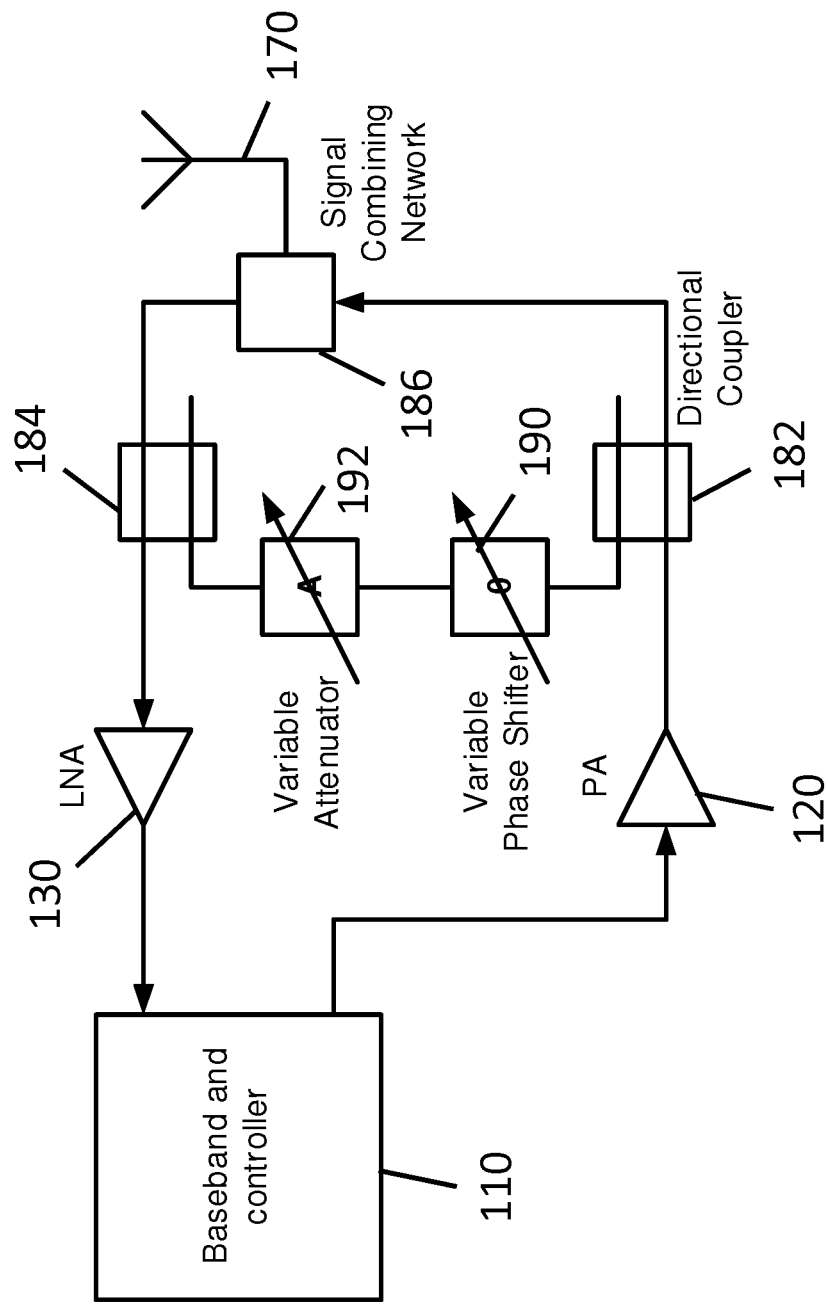
FIG. 5 shows a single antenna system for full-duplex communication comprising a single cancellation path.

An alternative to this is shown in FIG. 5. FIG. 5 shows a single antenna system for full-duplex communication comprising a single cancellation path. The system is much like that of FIG. 4; however, additional couplers are located after the receive and transmit path that couple these paths to a cancellation path that feeds back the transmit signal to the receive path to cancel any interference on the receive path caused by transmission by the antenna 170.

A first directional coupler 182 is connected between the output of the power amplifier 120 and a signal combining network 186. A second directional coupler 184 is connected between the input of the low noise amplifier 130 and the signal combining network 186. The signal combining network 186 combines the transmit and receive paths to allow full-duplex operation of the antenna 170. The signal combining network may be a Wilkinson power splitter/combiner, a directional coupler, a rat-race coupler or a hybrid coupler.

The first 182 and second 184 directional couplers are connected together via the cancellation path. The cancellation path comprises a variable phase shifter 190 and a variable attenuator 192. This allows the cancellation signal that is fed back from the transmit path to be tuned to cancel any of the transmit signal that is received on the receive path. Having said this, by passing some of the transmit signal back to the receive path, the transmission power is reduced thereby reducing the efficiency of the system.

During operation, there may exist multiple objects against which transmissions may be reflected back to the antenna. Accordingly, multiple different reflected signals may be picked up by the antenna and passed to the receive path. To counteract such reflections, multiple cancellation paths may be utilised.

Figure 6:
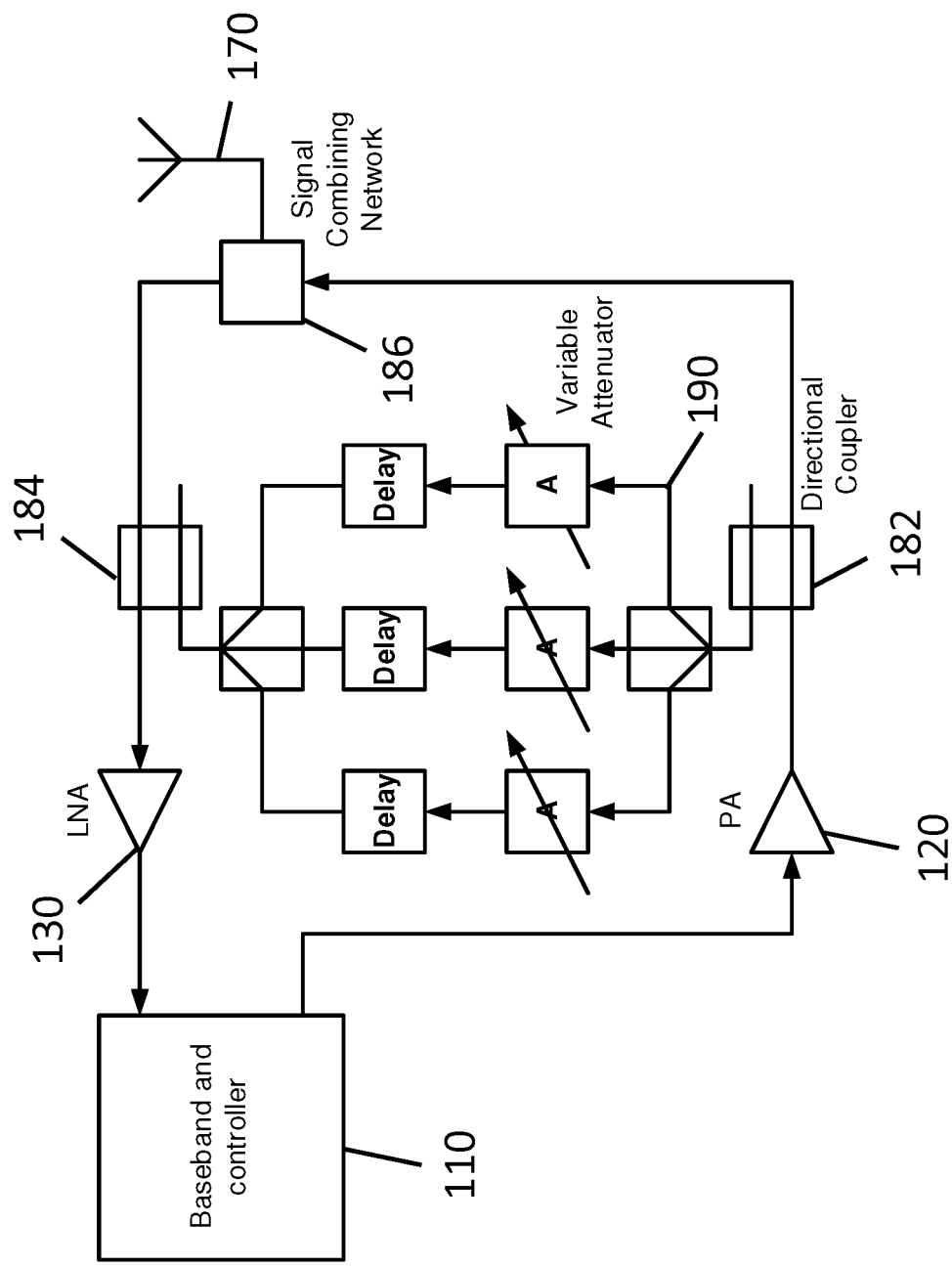
FIG. 6 shows a single antenna system for full-duplex communication comprising multiple cancellation paths.

FIG. 6 shows a single antenna system for full-duplex communication comprising multiple cancellation paths. The system is much like that of FIG. 5; however, the single cancellation path is replaced with multiple cancellation paths 190. A three way power divider is connected to each directional coupler 182, 184 to split the cancellation path into three cancellation paths 190 and then recombine the signals for feedback into the receive path. Each cancellation path comprises a variable attenuator and a delay element. Each cancellation path can be tuned to a different reflected signal to improve isolation between the receive and transmit paths. Having said this, this system suffers the same issues as that of FIG. 5 in that the transmit signal is attenuated thereby reducing efficiency and decreasing the signal to noise ratio of the system.

Figure 7:
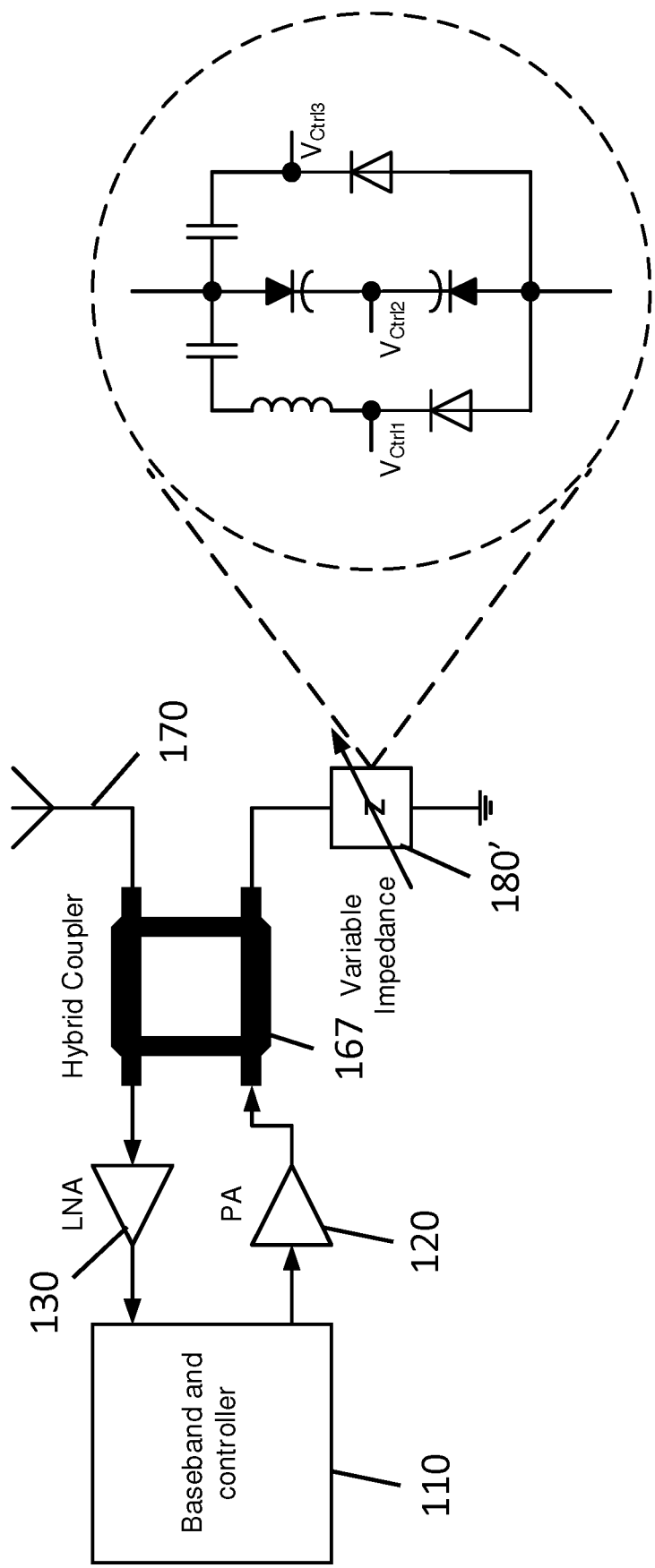
FIG. 7 shows a single antenna system for full-duplex communication comprising a hybrid coupler wherein the spare port of the hybrid coupler is connected to a variable impedance element.

Efficiency can be improved by not utilising cancellation paths and instead providing isolation by controlling the impedances at the ports, for instance, as shown in FIG. 7. FIG. 7 shows a single antenna system for full-duplex communication comprising a hybrid coupler 167 wherein the spare port of the hybrid coupler 167 is connected to a variable impedance element 180'. The optimal impedance for isolating the receive path from the transmit path may change depending on the frequency of transmission or based on the surrounding environment. The system of FIG. 7 is much like the system of FIG. 4; however, the impedance can be varied to improve performance. Tuning the impedance connected to the fourth port allows the reflection coefficient of the fourth port to be varied until the reflected signals are of an equal magnitude but have an opposite phase to the transmit signal that leaks into the transmit path. This helps to cancel out any interference produced by such leakage.

The variable impedance element 180' varies its impedance through use of varactor diodes (variable capacitance diodes) which have a limited tuning range and can incur high losses when fabricated as part of an integrated circuit (IC).

Arrangements described herein utilise a system similar to FIG. 7, wherein a variable impedance element 180' is connected to the fourth port of the hybrid coupler 167; however, the variable impedance is provided via one or more sets of variable attenuators and variable delay lines.

Figure 8:
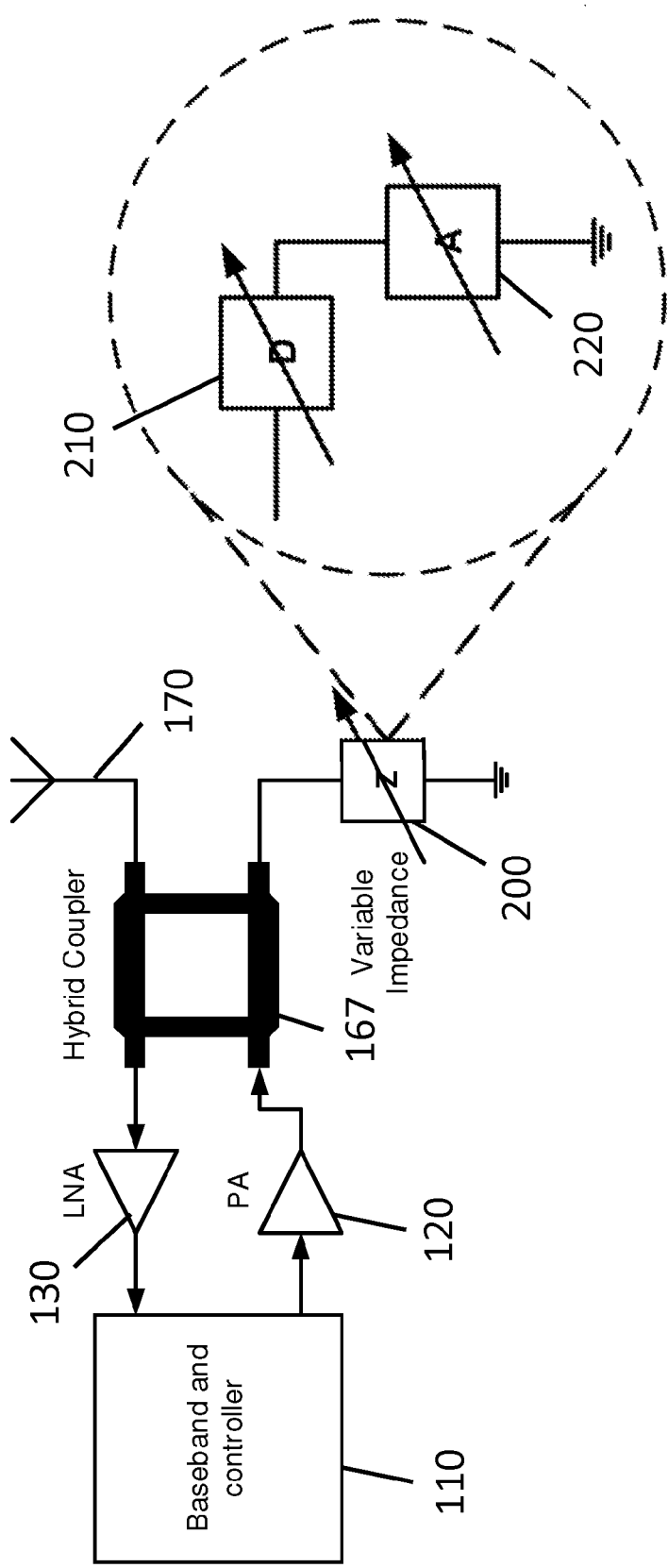
FIG. 8 shows a single antenna system for full-duplex communication comprising a variable impedance element according to an arrangement.

FIG. 8 shows a single antenna system for full-duplex communication comprising a variable impedance element 200 according to an arrangement. The system is the same as that of FIG. 7; however, the variable impedance element 200 comprises a variable delay line 210 connected to a variable attenuator 220. The variable delay line 210 is connected to the input of the variable impedance module 200 (connected to the hybrid coupler 167) and the variable attenuator 220 is connected to ground. Having said this, the variable impedance element 200 is non-polarized. Accordingly, the order of the variable delay line 210 and the variable attenuator 220 can be reversed without affecting the function of the variable impedance element 200. In addition, the variable impedance element 200 may not be connected to ground, and may instead be left as an open circuit.

Figure 9:
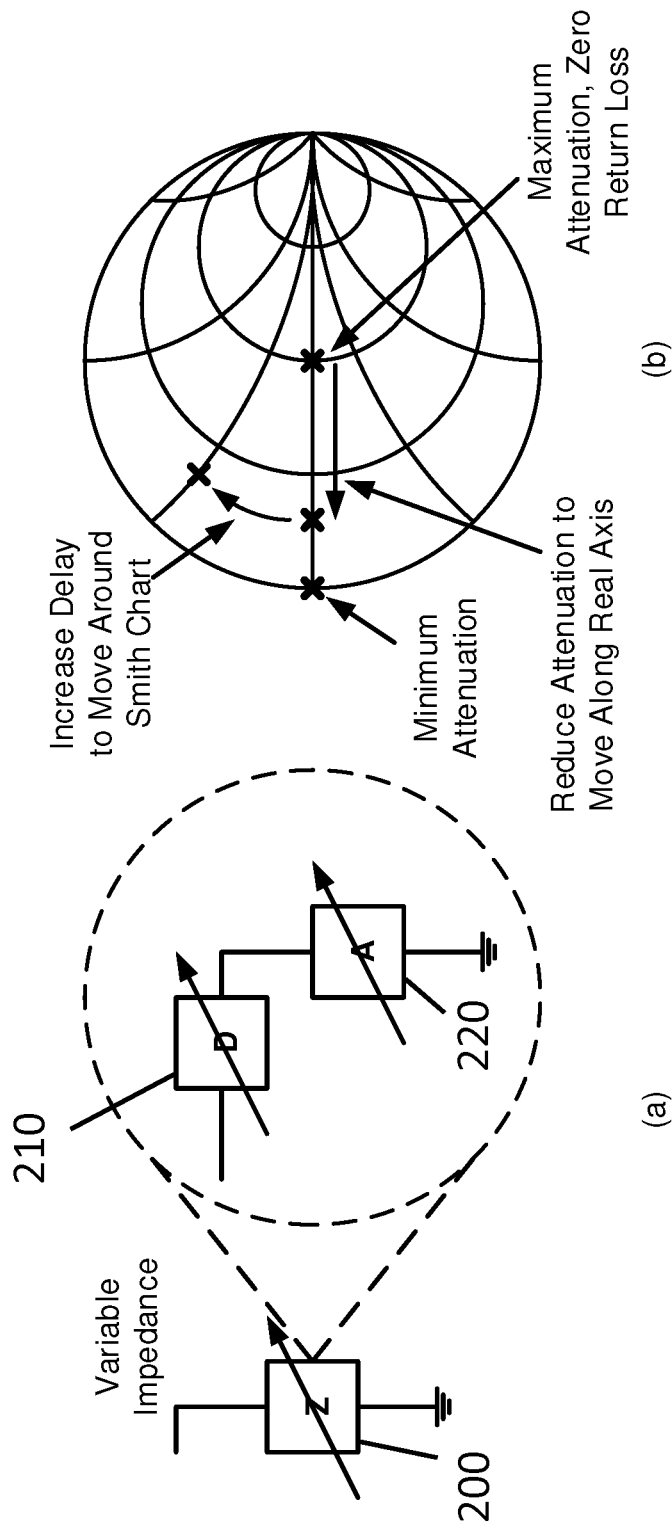
FIG. 9 shows a variable impedance element according to an arrangement.

FIG. 9 shows a variable impedance element 200 according to an arrangement. FIG. 9(a) shows the composition of the variable impedance element 200 and FIG. 9(b) shows a Smith chart for the variable impedance element 200. FIG. 9(a) is the variable impedance element 200 shown in FIG. 8.

FIG. 9(b) shows a Smith chart for the variable impedance element 200. This shows how a given impedance can be represented by a given reflection coefficient in terms of the real and imaginary parts of the reflection coefficient at the fourth port of the hybrid coupler 167. Increasing the attenuation moves the system along the real axis whilst increasing the delay moves the system around the Smith chart. Accordingly, adjusting the delay adjusts the angle of the reflection coefficient whilst adjusting the attenuation adjusts the magnitude of the reflection coefficient.

Adjusting the impedance at the fourth node to emulate the antenna connected to the third node allows the signals reflected at the fourth node to cancel those reflected at the antenna node. This provides isolation between the transmission and receive lines.

The separate variable delay line 210 and variable attenuator 220 therefore provides improved control. The phase and magnitude of the reflection coefficient can be independently controlled. When connected to a controller, the controller will have to scan all possible points when first powered on to set the initial impedance, and then perform periodic updates. With the system of FIG. 4, the single control element means that both phase and magnitude will be adjusted at the same time. The independent control of phase and magnitude provided by the system of FIG. 7 allows the reflection coefficient to be more effectively controlled thereby improving isolation in the system.

The use of a variable attenuator 220 and variable delay line 210 results in a system that is tuneable over a large range, and is suitable for integrated circuit (IC) fabrication (e.g. CMOS) with standard switching elements, thereby making digital control easier. In addition, the separate variable delay line 210 and variable attenuator 220 allow the magnitude and phase of the reflection coefficient at the fourth port to be independently controlled. This provides a more effective system that can operate in full-duplex mode with improved isolation between the receive and transmit paths.

Figure 10:
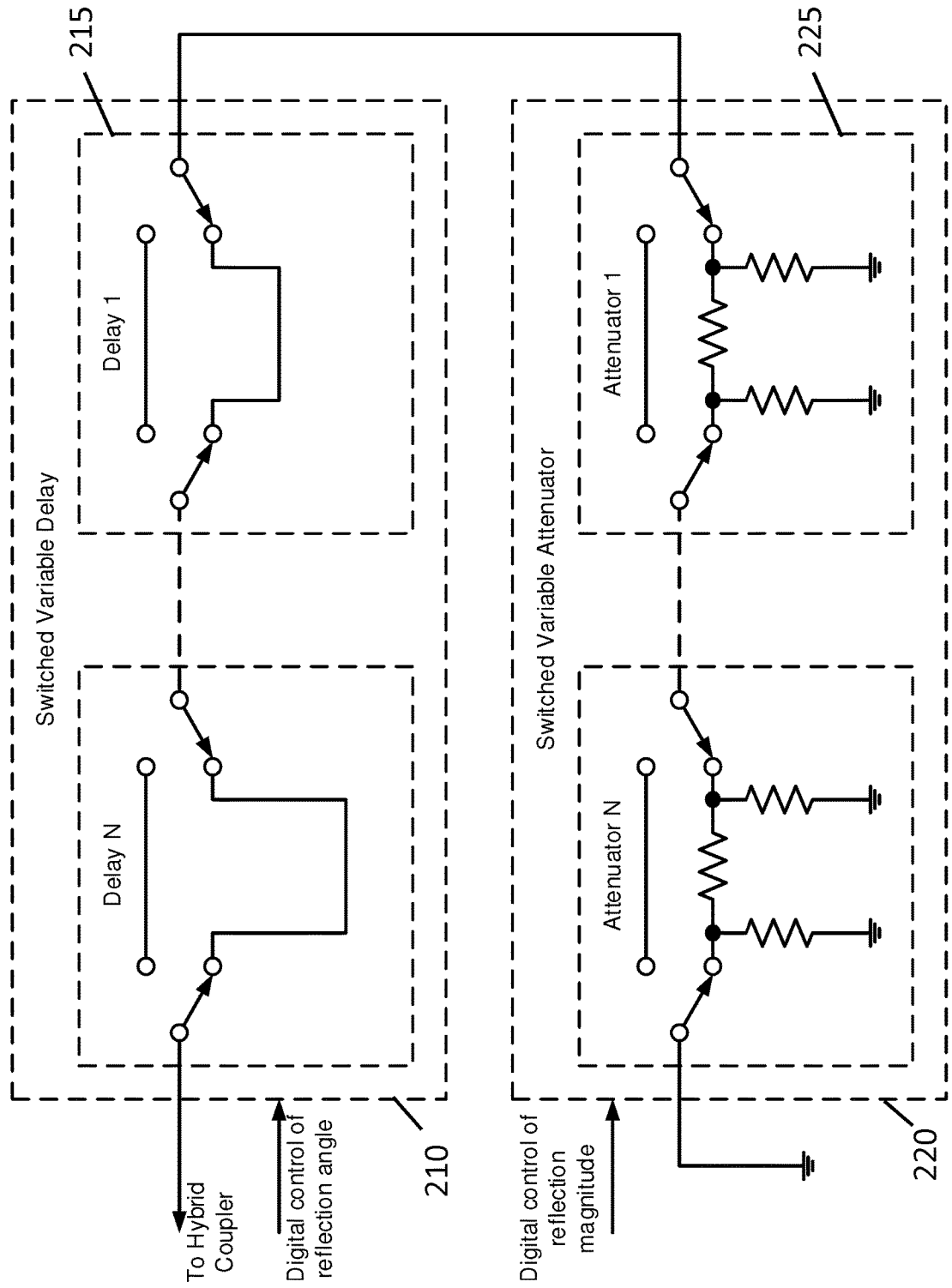
FIG. 10 shows a variable impedance element comprising a switched attenuator and a switched delay line according to an arrangement.

FIG. 10 shows a variable impedance element comprising a switched variable attenuator 210 and a switched variable delay line 220 according to an arrangement. The switched variable delay line 210 comprises a series of switched variable delay elements 215. Each switched variable delay element 215 comprises a bypass line and a delay line parallel to each other, with a two-way switch at each end to allow switching between the bypass line and the delay line.

The delay line may be any form of analogue delay line. This may be in the form of a long transmission line (as shown in FIG. 10) or in the form of a set of cascaded resistor-capacitor circuits or inductor-capacitor circuits.

The delay line adds a delay (a phase change) to the signal relative to the bypass line. Accordingly, by switching between the delay line and the bypass line for each switched variable delay element 215 the overall delay across the switched variable delay line 210 can be varied. A digital control signal is supplied by the controller 110 to the switched variable delay line 210 to control the switching for each switched variable delay element 215.

The switched variable attenuator 220 comprises a series of switched variable attenuating elements 225. Each variable attenuating element 225 comprises a bypass line and an attenuating line parallel to each other, with a two-way switch at each end to allow the switching between the bypass line and the attenuating line.

The attenuating line comprises a number of resisters in the form of an unbalanced pi pad attenuator. That is, a first resistor is connected in series between the two two-way switches and each end the first resistor is connected to ground (or a similar reference voltage) via further resistors. Having said this, a T pads may be used as an alternative to pi pads.

Each variable attenuating element 225 attenuates the signal (reduces the power of the signal) relative to the bypass line. Accordingly, by switching between the attenuating line and the bypass line for each switched variable attenuating element 225 the overall attenuation across the switched variable attenuator 220 can be varied. A digital control signal is supplied by the controller 110 to the switched variable attenuator 220 to control the switching for each switched variable attenuating element 225.

Figure 11:
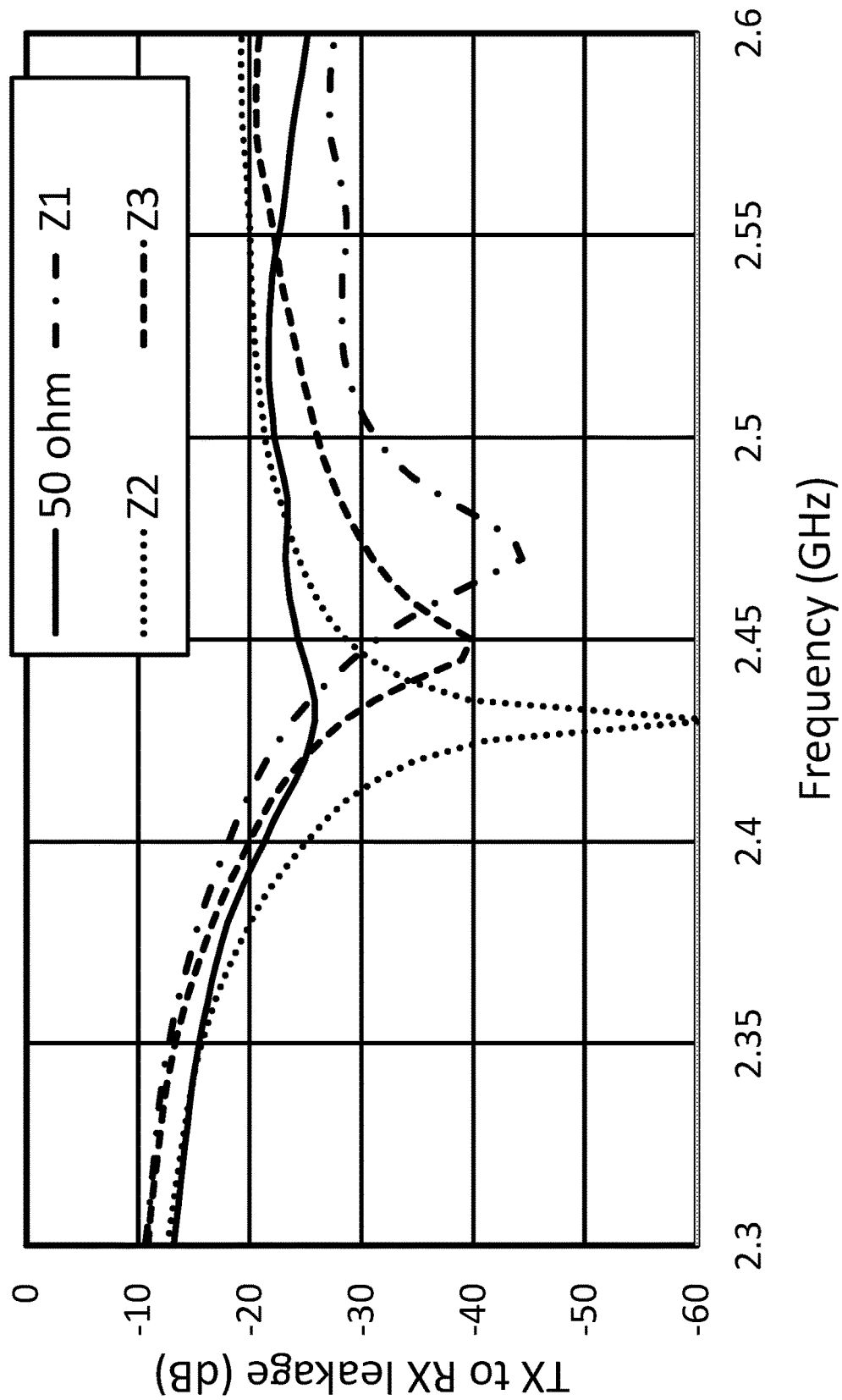
FIG. 11 shows the leakage caused by transmission as a function of transmission frequency measured using the system of FIG. 8 and compared to measurements taken using the system of FIG. 4.

FIG. 11 shows the leakage caused by transmission as a function of transmission frequency measured using the system of FIG. 8 and compared to measurements taken using the system of FIG. 4. Measurements were taken for systems terminating the fourth port of the hybrid coupler with a 50Ω resistor (system of FIG. 4) or three different settings of the variable impedance: Z1, Z2 and Z3 (arrangement of FIG. 8). The system incorporating variable impedances show significant improvement in the isolation compared to the system incorporating a set resistance. Equally, by varying the impedance, it can be seen that the arrangement of FIG. 8 can provide a tuneable null between 2.43 GHz and 2.47 GHz. This allows the interference from transmission to be effectively cancelled by tuning the impedance to the system and environment in which it is operating.

Figure 12:
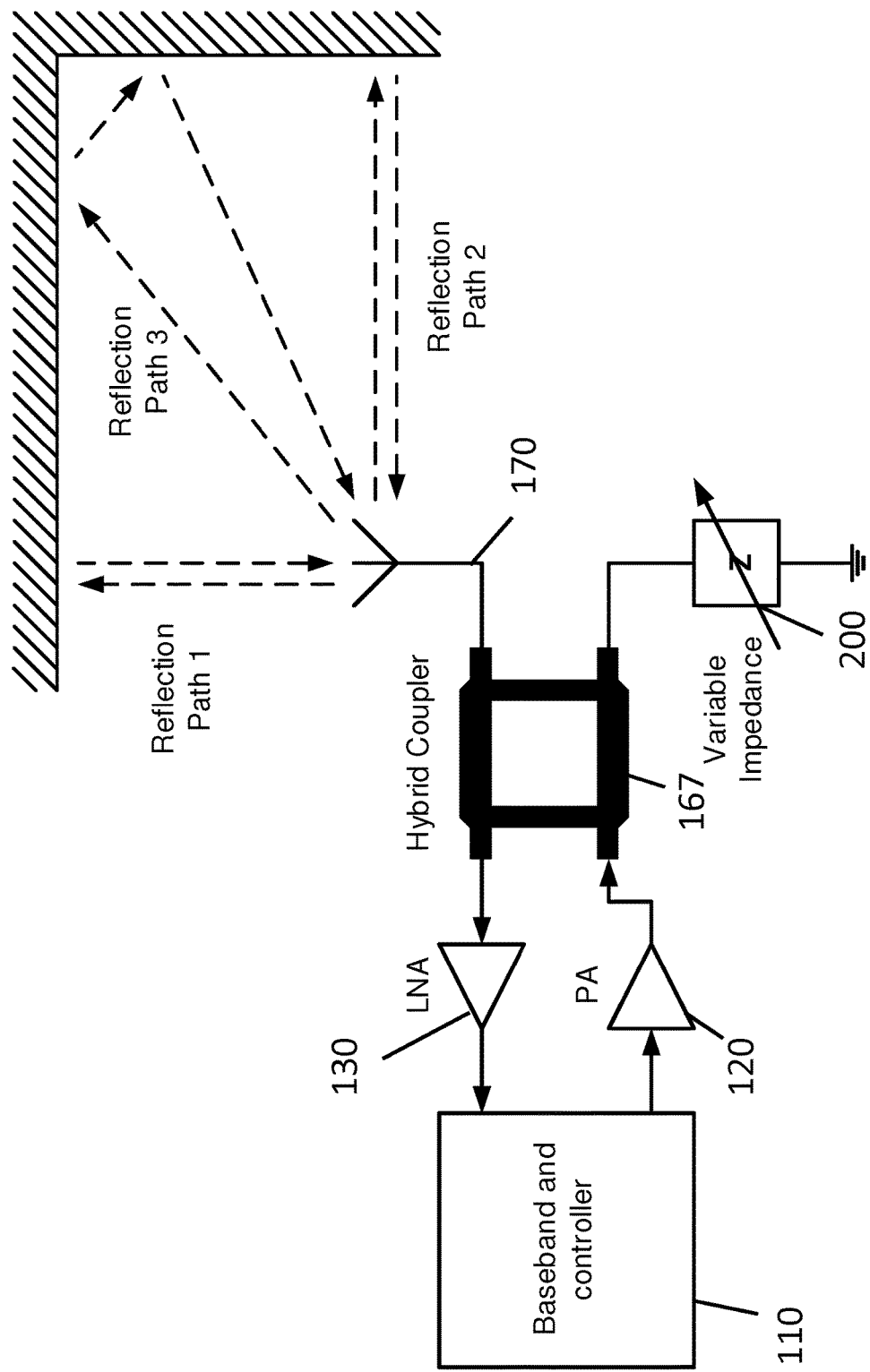
FIG. 12 shows reflection paths of signals transmitted according to an arrangement.

In a realistic environment, multiple reflections will exist which will cause the transmitted signal to enter the receive path, as shown in FIG. 12.

FIG. 12 shows reflection paths of signals transmitted according to the system of FIG. 8. A signal is transmitted by the antenna 170 and reflected off of a nearby wall. As there is a corner in the wall, there are multiple reflected signals that are returned to the antenna, each following a different reflection path. Given that the wall is located close to the antenna 170, these signals can be large and would generate significant interference. Some could be too large for the digital baseband to cancel and so cancellations must be done in the analogue/RF domain. There will also be reflections from any objects in the room, e.g. furniture and also any people. As these objects may be moving (for instance, people) this provides a dynamically changing environment.

Arrangements described herein incorporate multiple variable impedances at different variable delays to cancel interference from different reflections. As the reflected signals will have travelled different distances, they will have differing phases. Providing a variable impedance for each reflected signal allows each reflected signal to be individually cancelled out, thereby improving the isolation and reducing interference. The number of variable impedances and delay lines required will therefore depend on the number of reflections produced by the surrounding environment.

Figure 13:
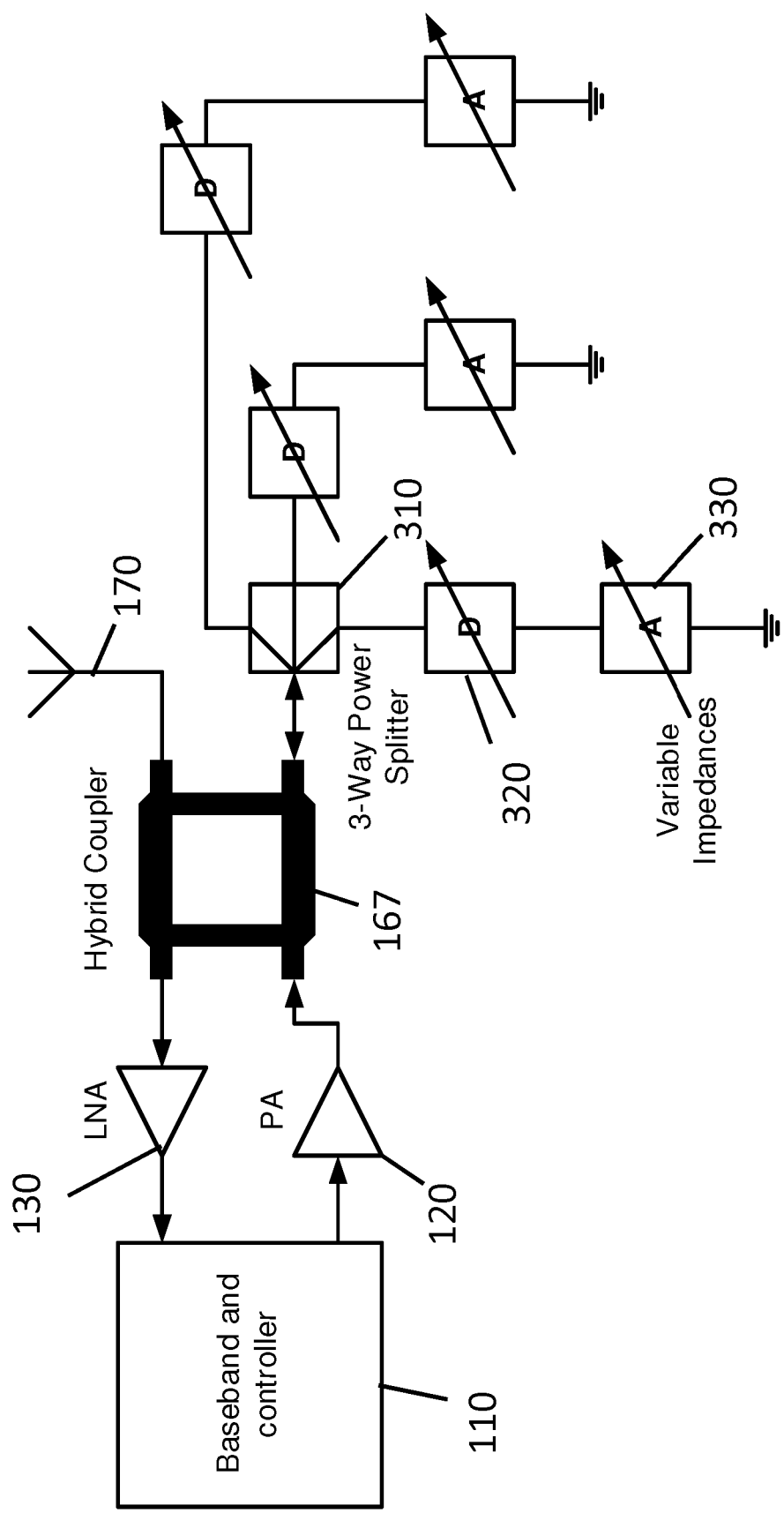
FIG. 13 shows a system comprising multiple variable impedances according to an arrangement.

FIG. 13 shows a system comprising multiple variable impedances according to an arrangement. The system is the same as that of FIG. 11; however, three variable impedance elements are connected to the fourth port of the hybrid coupler 167 via a three-way power splitter 310. This splitter could be, for example, a Wilkinson type splitter, or any other type of isolated splitter/combiner. Each variable impedance element is the same as that shown in FIG. 8, in that each comprises a variable delay line 320 and a variable attenuator 330, and each variable impedance element is connected to ground. Each variable impedance element may be tuned to a specific reflected signal to ensure that interference from multiple reflection paths may be reduced effectively. Whilst the present arrangement shows only three variable impedance elements, any number of variable impedance elements may be utilised, along with the appropriate power splitter, to cancel out any number of reflected signals.

By applying the variable impedances to the hybrid coupler, the reflection coefficient at the fourth port of the hybrid coupler can be tuned to cancel out any transmission leakages. This incurs less signal loss than the system of FIG. 6 which reduces the transmit power and hence the power amplifier efficiency.

Arrangements can also implement full-duplex multiple-in and multiple-out (MIMO) transmission. This can greatly increase the throughput of the system.

Figure 14:
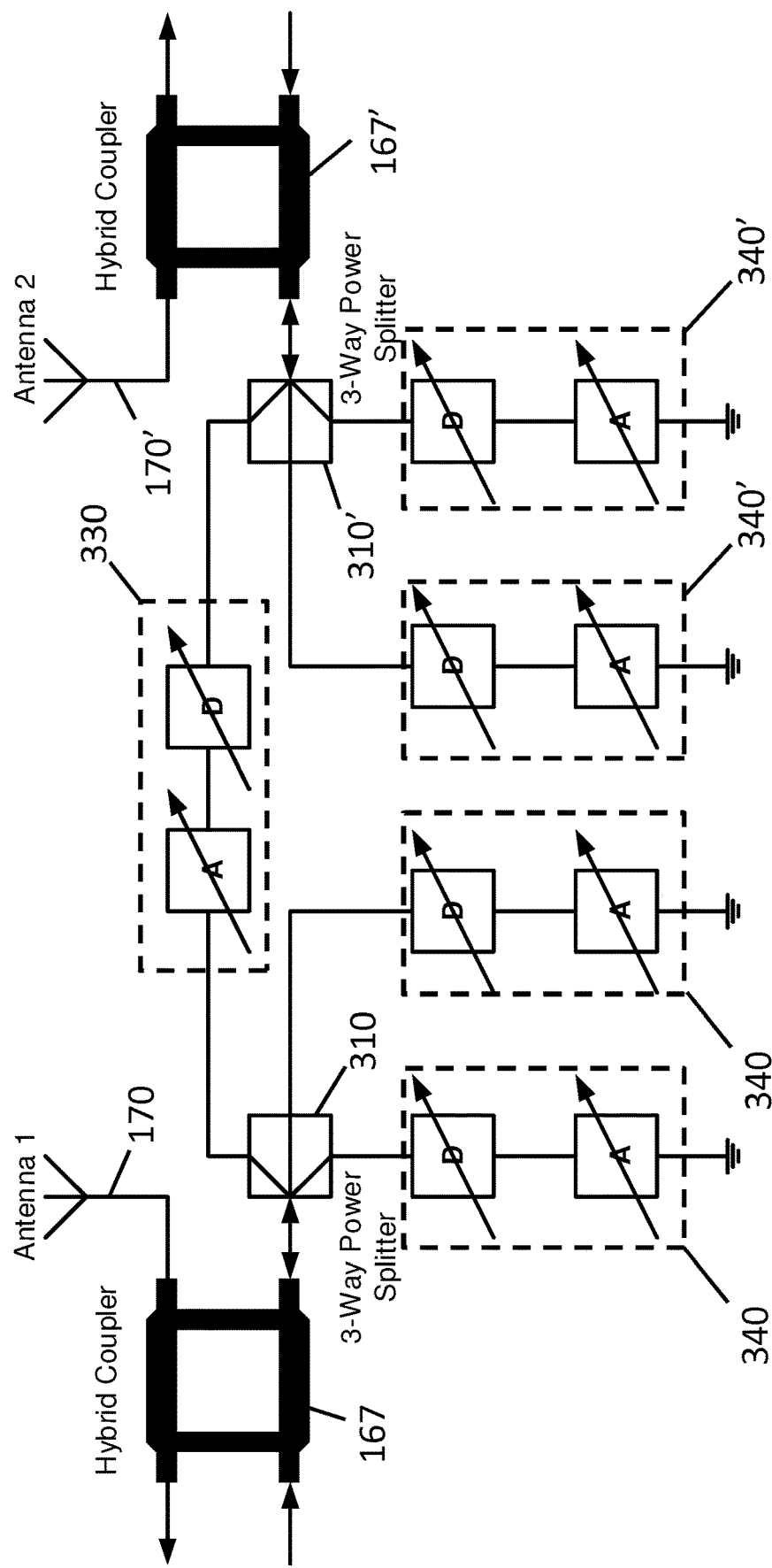
FIG. 14 shows a full duplex multiple-in and multiple-out (MIMO) system according to an arrangement.

FIG. 14 shows a full duplex multiple-in and multiple-out system according to an arrangement. The system comprises two transceivers according to FIG. 13, connected via a shared variable impedance element 330.

As shown in FIG. 13, each transceiver includes a hybrid coupler 167, 167'. Each hybrid coupler 167, 167' is connected at its second port to an antenna 170, 170'. Each hybrid coupler 167, 167' is coupled to a respective antenna 170, 170' at a second port. Each hybrid coupler 167,167' receives transmit signals for transmission at a third port and outputs signals received at the antenna at a first port. The fourth port of each hybrid coupler 167, 167' is connected to a three way power splitter 310, 310'. Two of the outputs of the three way power splitters 310, 310' are each connected to ground via a variable impedance element 340, 340', as in FIG. 13. The remaining outputs of the three-way splitters 310, 310' are connected to opposite ends of the shared variable impedance element 330.

As with the system of FIG. 13, any number of variable impedance elements may be utilised in this arrangement. The shared variable impedance element 330 may be replaced with two variable impedance elements connected in series. This would allow the further cancellation of multiple room reflections. The system may receive signals for transmission and return received signals via a shared baseband processor and controller. Alternatively, independent controllers may be provided to each transceiver in the MIMO system. The system of FIG. 14 is a 2×2 MIMO, but the system may be expanded to include any number of antennas connected via a common node.

Figure 15:
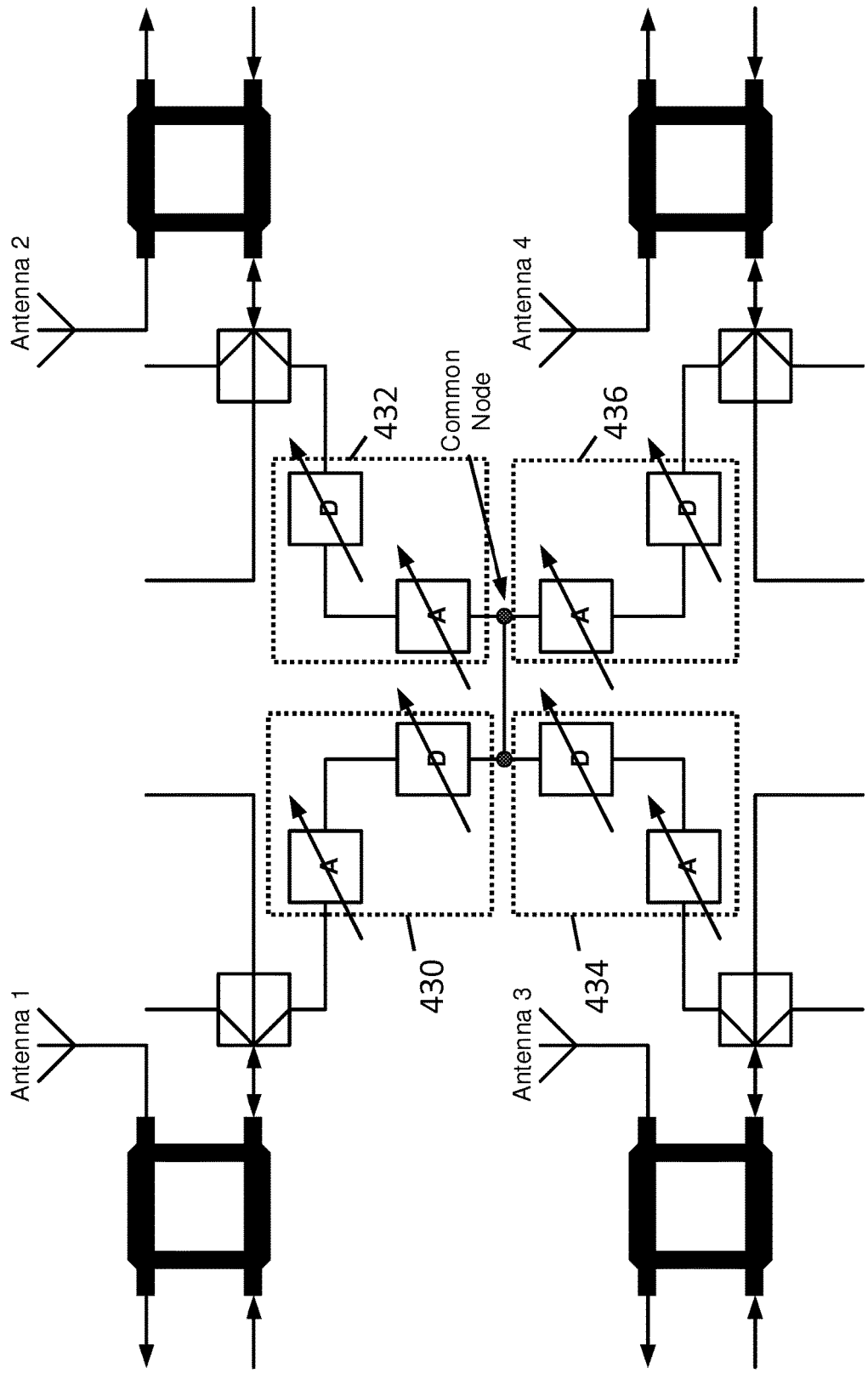
FIG. 15 shows a full duplex 4×4 MIMO system according to an arrangement.

FIG. 15 shows a full duplex 4×4 MIMO system according to an arrangement. In this system, four transceivers, as shown in FIG. 13 are connected via a common node connected to the end of one of the variable impedance elements 430-436 for each transceiver. The variable impedance elements 432, 436 for two of the transceivers are reversed relative to the variable impedance elements of the other two transceivers 430, 434. The first and third transceivers have their variable impedance elements 430, 434 arranged with their variable attenuator connected to their respective three-way splitter and their variable delay line connected to the common node. The second and fourth transceivers have their variable impedance elements 432, 436 reversed, such that their variable delay line is connected to their respective three-way splitter and their variable attenuator is connected to the common node. Having said this, the variable impedance elements 430-436 are non-polarised and so may be connected in any orientation. The remaining variable impedance elements are connected to ground, as shown in FIG. 13.

As with the system of FIG. 14, any number of variable impedance elements may be utilised in this arrangement. The system may receive signals for transmission and return received signals via a shared baseband processor and controller. Alternatively, independent controllers may be provided to each transceiver in the MIMO system. By varying the number of transceivers connected to the common node, as shown in FIG. 15, any number of transceivers may be implemented in the MIMO system. For instance, an 8×8 system may be formed by connecting eight transceivers to a common node via an omni-directional signal combining/splitting network such as a resistive power splitter.

Figure 16:
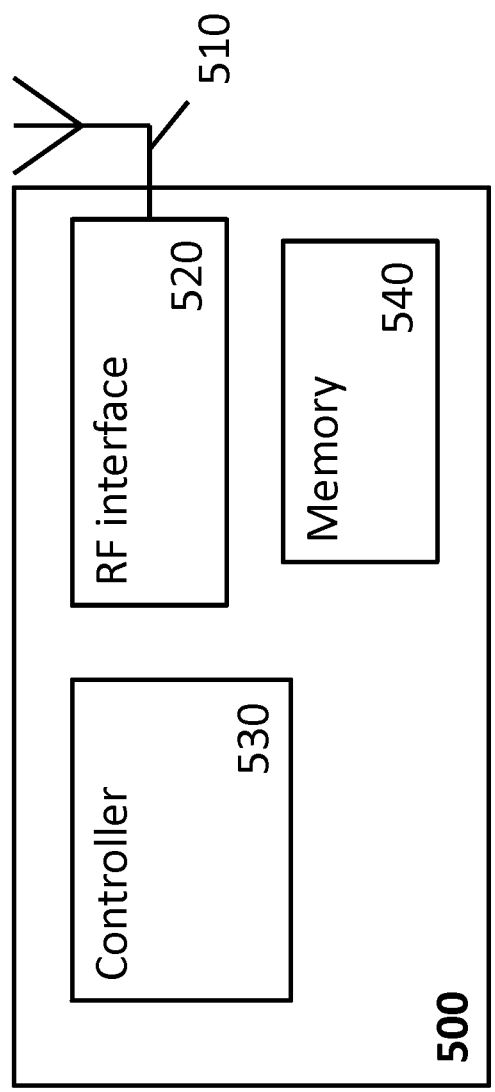
FIG. 16 shows a system incorporating a full-duplex transceiver system.

FIG. 16 shows a system incorporating a full-duplex transceiver system. The system 500 comprises an antenna 510 connected to a radio frequency (RF) interface 520. The RF interface 520 includes the amplifiers, hybrid coupler and variable impedance elements of FIG. 13 (although a similar arrangement may only implement a single variable impedance element as shown in FIG. 12). The RF interface 520 therefore amplifies signals that are received and transmitted at the antenna 510 and isolates the receive path from the transmit path. The RF interface 520 is also configured to modulate signals to be transmitted and demodulate received signals, although this may alternatively be implemented by the controller 530. The RF interface 520 receives the signals to transmit from a controller 530. The RF interface is also configured to provide received signals to the controller 530.

The controller 530 is configured to provide the signals to be transmitted according to the needs of the system 500 and to receive and interpret signals received by the antenna 510. In addition, the controller 530 is configured to control the variable impedances for the RF interface 520 in order to tune the system to reduce the leakage from the transmission path to the receive path. This may be implemented manually via a user interface or automatically by the controller 530 according to a set of predefined rules. For instance, the controller 530 may iteratively test the leakage in the system and adjust the impedance to reduce the leakage. The controller 530 performs its functions in accordance with computer executable code stored in memory 540.

The arrangements described herein could be integrated easily into existing systems. They may be utilised in broadband operation and so could cover a number of different bands allowing usage with multi-standard radio (MSR) or distributed antenna systems (DAS).

The arrangements described herein have been described with reference to the IEEE 802.11ax WiFi protocol. Having said this, the concepts described herein are equally applicable to any WiFi systems or any other communications systems where full-duplex operation is useful. For instance, further arrangements are used in radio frequency identification (RFID) systems such as near field communication (NFC) systems. In addition, arrangements may be implemented in mobile phone base stations that look to utilise full-duplex communication.

Whilst the arrangements discussed above include hybrid couplers, any form of signal coupler may be used. Equally, whilst the variable impedance elements described herein include variable delay lines, any form of variable phase shifter may be used.

The arrangements described herein provide improved full-duplex RF transmission systems that operate more efficiently, effectively cancel out interference from transmitted signals and avoid reductions in the transmit power associated with other methods of transmission thereby improving the signal to noise ratio and range of transmissions. The variable impedance elements described herein provide improved operation over a large tuning range and are suitable for integrated circuit fabrication utilising common components. In addition the arrangements described herein include a simplified design that can be implemented in a smaller format suitable for use in systems with strict space requirements. The arrangements described herein can include multiple antennas to allow full-duplex MIMO operation. The arrangements of the MIMO systems include a degree of repetition thereby reducing implementation cost.

While certain arrangements have been described, the arrangements have been presented by way of example only and are not intended to limit the scope of the inventions. Indeed, the novel methods, systems and devices described herein may be embodied in a variety of other forms; furthermore, various omissions, substitutions and changes in the form of the methods and systems described herein may be made.

The invention claimed is:

1. A system comprising:
   baseband circuitry configured to modulate a transmission signal having a first frequency band, and to demodulate a reception signal having a second frequency band, wherein the transmission signal is to be transmitted via an antenna, and the reception signal is received via the antenna, the first frequency band and the second frequency band are at least partially overlapped, and the transmission signal and the reception signal are subject to a full duplex scheme;
   a signal coupler comprising:
      an antenna node configured to be electrically coupled to the antenna;
      an input node configured to receive, from the baseband circuitry, the transmission signal to be transmitted via both the antenna node and the antenna;
      an output node configured to transmit, to the baseband circuitry, the reception signal received via both the antenna node and the antenna; and
      a coupling node electrically coupled to the antenna node; and
   a variable impedance element electrically coupled to the coupling node to reduce interference between the transmission signal and the reception signal, the variable impedance element comprising a power splitter and a plurality of sets of a variable phase shifter and a variable attenuator, each variable phase shifter being electrically coupled to a corresponding variable attenuator,
   wherein a signal output from the coupling node is split by the power splitter, and signals split by the power splitter are re-combined by the power splitter, and the signal re-combined by the power splitter are input to the coupling node.

2. A system according to claim 1 wherein the system is configured to adjust an impedance of the variable impedance element to reduce the interference between the transmission signal and the reception signal.

3. A system according to claim 1 wherein the system comprises one or more further variable impedance elements and wherein the variable impedance element and the one or more further variable impedance elements are coupled to a coupling terminal via the power splitter.

4. A multiple-input and multiple-output system for duplexing radio frequency signals, the system comprising a plurality of systems according to claim 1 wherein the systems are connected to each other via a common node connected to the coupling node of each system.

5. The multiple-input and multiple-output system of claim 4 wherein one or more of the systems have a variable impedance element located between the coupling node for the respective system and the common node.

6. The multiple-input and multiple-output system of claim 4 wherein each of the systems has a variable impedance element located between the coupling node for the respective system and the common node.

7. A device for wireless communication comprising:
   a system according to claim 1;
   the antenna connected to the antenna node of the signal coupler for full duplex wireless communication; and
   a controller configured to:
      provide the transmission signal to the input node of the signal coupler;
      receive from the output node of the signal coupler the reception signal; and
      control the variable impedance element to reduce the interference between the transmission signal and the reception signal.

8. A method being performed by a system comprising
baseband circuitry configured to modulate a transmission
signal having a first frequency band, and to demodulate
a reception signal having a second frequency band,
wherein the transmission signal is to be transmitted via
an antenna, and the reception signal is received via the
antenna, the first frequency band and the second frequency band are at least partially overlapped, and the
transmission signal and the reception signal are subject
to a full duplex scheme,
a signal coupler comprising an antenna node configured to
be electrically coupled to the antenna, an input node, an
output node and a coupling node, and
a variable impedance element electrically coupled to the
coupling node, the variable impedance element comprising a power splitter and a plurality of sets of a
variable phase shifter and a variable attenuator, each
variable phase shifter being electrically coupled to a
corresponding variable attenuator,
the method comprising:
receiving at the input node, from the baseband circuitry,
the transmission signal to be transmitted via both the
antenna node and the antenna and transmitting, to the
baseband circuitry, the transmission signal at the
antenna node;
receiving at the antenna node the reception signal
received by the antenna and transmitting the reception
signal at the output node;
applying a variable impedance to the coupling node via
the variable impedance element to reduce interference
between the transmission signal and the reception signal;
splitting a signal output from the coupling node by the
power splitter, and re-combining signals split by the
power splitter, and inputting the signal re-combined by
the power splitter to the coupling node.

9. A method according to claim 8 wherein the method
further comprises adjusting an impedance of the variable
impedance element to reduce the interference between the
transmission signal and the reception signal.

10. A method according to claim 8 wherein the system
comprises one or more further variable impedance elements,
the variable impedance element and the one or more further
variable impedance elements are coupled to a coupling
terminal via the power splitter, and the method further
comprises applying one or more further variable impedances
to the coupling node via the one or more further variable
impedance elements.

11. A multiple-input and multiple-output method for
duplexing signals, the method comprising connecting a
plurality of systems according to claim 1 to each other via
a common node connected to the coupling node of each
system.

12. The multiple-input and multiple-output method of
claim 11 wherein one or more of the systems are connected
to the coupling node via a variable impedance element
located between the coupling node for the respective system
and the common node.

13. The multiple-input and multiple-output method of
claim 11 wherein each of the systems is connected to the
coupling node via a respective variable impedance element
located between the coupling node for the respective system
and the common node.

14. A system according to claim 1, further comprising a
controller configured to control both of a variable phase
shifter and a variable attenuator independently.

15. A system according to claim 1, further comprising a
controller configured to control a set of the variable phase
shifter and the variable attenuator to adjust a phase and a
magnitude of a reflection coefficient at the coupling node,
the reflection coefficient corresponding to a reflection signal
returned to the antenna.

* * * * *